(12) United States Patent
Maurer

(10) Patent No.: US 8,011,863 B2
(45) Date of Patent: Sep. 6, 2011

(54) MONOBLOC SURFACE MILLING CUTTER

(75) Inventor: Eugen Maurer, Ober-Mörlen (DE)

(73) Assignee: Jakob Lach GmbH & Co. KG, Hanau (DE)

( * ) Notice: Subject to any disclaimer, the term of this patent is extended or adjusted under 35 U.S.C. 154(b) by 0 days.

(21) Appl. No.: 12/195,483

(22) Filed: Aug. 21, 2008

(65) Prior Publication Data

US 2009/0060662 A1  Mar. 5, 2009

(30) Foreign Application Priority Data

Aug. 24, 2007  (DE) .................... 20 2007 011 816 U

(51) Int. Cl.
*B23C 5/00* (2006.01)
*B23B 27/14* (2006.01)

(52) U.S. Cl. .......................................... 407/119; 407/67

(58) Field of Classification Search .................... 407/33, 407/67, 119; 428/698, 689

See application file for complete search history.

(56) References Cited

U.S. PATENT DOCUMENTS

| | | | |
|---|---|---|---|
| 2,379,347 A * | 6/1945 | Fiedler | 29/49 |
| 2,710,180 A * | 6/1955 | Graham | 299/103 |
| 2,716,799 A * | 9/1955 | Bader | 407/67 |
| 3,145,600 A * | 8/1964 | Sweet | 82/158 |
| 3,295,187 A * | 1/1967 | Plummer | 407/67 |
| 3,434,554 A * | 3/1969 | Bower, Jr. | 175/420.1 |
| 5,672,031 A * | 9/1997 | Oles | 407/35 |
| 5,981,057 A * | 11/1999 | Collins | 428/334 |
| 2002/0071729 A1 * | 6/2002 | Middlemiss et al. | 407/114 |

FOREIGN PATENT DOCUMENTS

DE   20303520.8       7/2003
GB   2100774 A  *   1/1983

* cited by examiner

*Primary Examiner* — Will Fridie, Jr.
(74) *Attorney, Agent, or Firm* — Stites & Harbison PLLC; Douglas E. Jackson

(57) ABSTRACT

The monoblock surface milling cutter has a milling cutter body (10) to which cutting plates (16) made of polycrystalline diamond (PCD), monocrystalline diamond (MCD) or polycrystalline boron nitrite (PCB) are fastened in a material-to-material fashion. In order to improve the surface quality of the work pieces manufactured with the milling cutter, axially adjustable finishing inserts (18) are fixed in place in at least two substantially axially extending bores (26), which are open at the front, of the milling cutter body (10). The finishing inserts (18) can also be equipped with cutting plates made of PCD, MCD or PCB. Preferably the cutting edges (24) of the cutting plates (22) of the finishing insert (18) are forward curved. Their farthest forward point is located in relation to the axis of rotation of the milling cutter body (10) on a finishing circle diameter which is maximally 4 to 8 mm less than the diameter created by the cutting edges arranged on the exterior circumference of the milling cutter body (10).

4 Claims, 1 Drawing Sheet

MONOBLOC SURFACE MILLING CUTTER

FIELD OF THE INVENTION

The invention relates to a monobloc surface milling cutter having cutting plates made of polycrystalline diamond (PCD), monocrystalline diamond (MCD) or polycrystalline boron nitrite (PCB), which are fastened to a milling cutter body in material-to-material fashion.

BACKGROUND OF THE INVENTION

Such a monobloc surface milling cutter is described in German Utility Model 203 03 520.8. In contrast to conventional surface milling cutters with reversible plates or exchangeable cassettes, it has the advantage that it is possible to attach substantially more cutting plates to the circumference of a cutter body of a defined size, so that an increased chip removal output is obtained. It is moreover possible to operate monobloc surface milling cutters at higher rpm and cutting speeds of up to 7000 m/min without accuracy being sacrificed. Milling cutters with reversible plates or exchangeable cassettes, which are fastened by means of screws, become unstable at such high centrifugal forces.

OBJECT AND SUMMARY OF THE INVENTION

The object of the invention is based on producing a surface milling cutter which, while retaining the advantages of said monobloc surface milling cutter, creates an even more improved surface quality.

In accordance with the invention the above object is attained in that axially adjustable finishing inserts can be fixed in place in a monobloc surface milling cutter of the type described at the outset in at least two substantially axially extending bores in the cutter body, which are open at the front.

The releasable fastening of the finishing inserts actually runs counter to the principle of a monobloc surface milling cutter, which is to make possible particularly high rpm and cutting speeds by means of a material-to-material fastening of the cutter bodies. However, it has been shown that doubts in this respect are groundless, because the finishing inserts are seated in axial, or substantially axial bores and are dependably held therein in a positive manner against high centrifugal forces.

It is advantageous within the framework of the entire concept if the finishing inserts are equipped with cutting plates made of PCD, MCD or PCB, which are fastened by means of a material-to-material contact. The surface roughness of the created level surfaces can be improved from approximately 8 to 15 µm to less than 5 µm.

In connection with the preferred actual embodiment, each finishing insert can be axially adjusted by means of a screw with two oppositely-turning threads, which cooperate with matched threaded bores in the milling cutter body and in the finishing insert respectively, and can be fixed in place in the axial bore by means of a clamping screw. A stepless adjustment of the finishing inserts is possible in this way.

It has been shown to be practical that the cutting edges of the cutting plates of the finishing inserts respectively extend radially, or with a radial direction component, in relation to the axis of rotation of the milling cutter body, and preferably are forward curved at a radius of 75 to 125 mm. In this case the point of the cutting edge of the finishing inserts, which is axially curved the farthest forward, should be located in relation to the axis of rotation of the milling cutter body on a finishing circle diameter which is maximally 4 to 8 mm less than the diameter created by the cutters on the shell surface of the cutting plates which are fastened by a material-to-material contact on the milling cutter body.

The invention will be explained in greater detail in what follows by means of an exemplary embodiment represented in the drawings.

DETAILED DESCRIPTION OF THE PREFERRED EMBODIMENT

Figure 1:
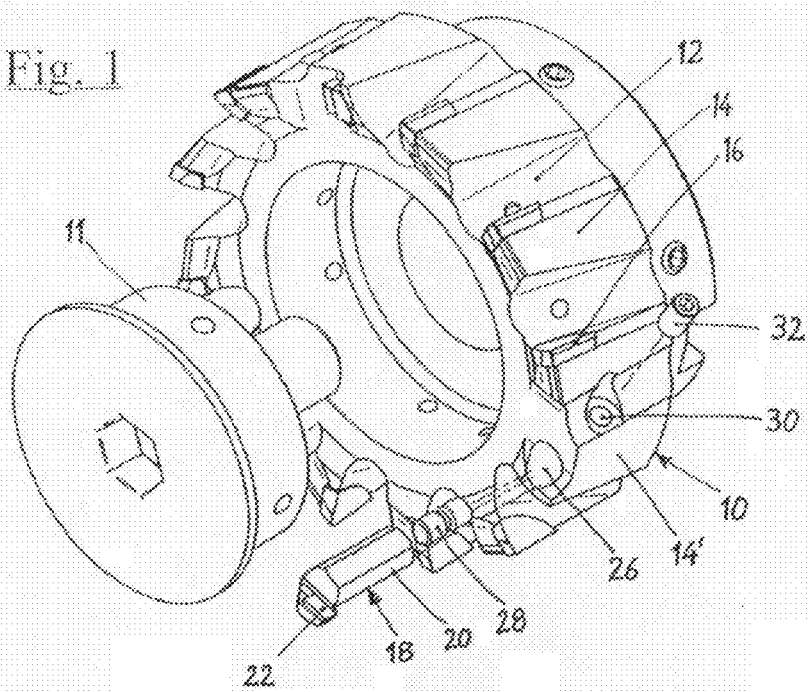
FIG. 1 is a perspective plan view of a monobloc surface milling cutter with three finishing inserts equipped with cutting plates of PCD.
Figure 2:
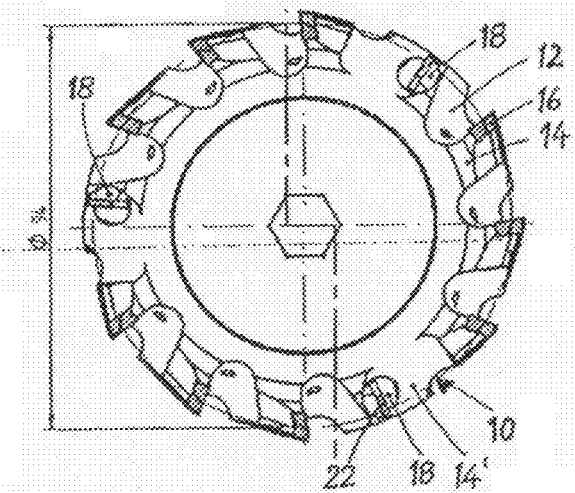
FIG. 2 is a front view of the milling tool in accordance with FIG. 1.

The surface milling cutter represented by way of the exemplary embodiment consists of a milling cutter body 10 made of tool steel, which is fastened by means of a screw 11 and is provided, at least at the cutting front end with cutouts 12, which are evenly distributed over the circumference and between which teeth 14 are formed. A cutting plate 16, consisting of a layer of polycrystalline diamond in a fixed connection with a support layer made of a hard alloy (cemented carbide), is soldered to the flank of the teeth 14 which is leading during the cutting operation. The layer made of the hard alloy can be fixedly soldered to the carrying surface of each leading tooth flank of the milling cutter body 10.

The geometry of the milling cutter body 10 and the cutting plates 16 is decided by the requirements in the individual case. The shape and size of the cutouts 12 should be of such dimensions that customary processing of the cutting plates 16 by conventional diamond processing methods is possible for re-sharpening the cutting plates 16. As shown, the required cutouts 12 in principle permit the placement of twelve cutting plates on the circumference of a milling cutter of a diameter of 100 mm.

It is understood that in connection with existing manufacturing technologies the cutting plates can also be fastened on the milling cutter body 10 in a manner different from soldering. Here, the possibility also exists of employing cutting plates 16 which only consist of PCD or PCB, i.e. do not have a base made of a hard alloy.

Figure 3:
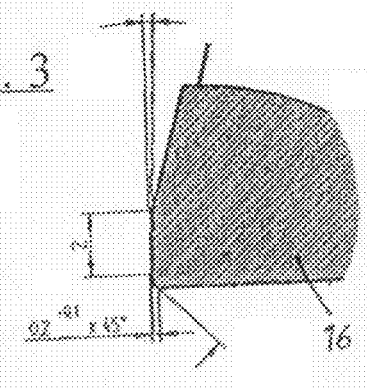
FIG. 3 is a plan view on a cutting plate at the periphery of the milling tool in accordance with FIGS. 1 and 2.

The cutting plates 16 are shell surface cutting edges which, in accordance with FIG. 3, have a longer cutting edge at the outer circumference, in the exemplary embodiment on the radius 50 mm, and which also perform cutting, or respectively smoothing operations, at the front with a short cutting edge of approximately 2 mm. If the milling tool is only equipped with such cutting plates 16, only a comparatively coarse surface roughness of approximately 8 to 15 µm is achieved on the created level surface.

Figure 4:
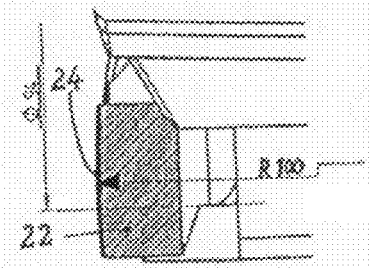
FIG. 4 is a plan view on the cutting plate of a finishing insert in the mounted state.

In addition to the cutting plates 16 operated as cutting edges on the shell and front cutting edges, the novel milling tool therefore has three finishing inserts 18, which are effective in the front, each consisting of a shaft 20, which is provided with a flattened clamping face for preventing turning and for clamping, and with a cutting plate 22 soldered to a step-like offset end, which finishes the level surface created in the course of surface milling. In accordance with FIG. 4, the cutting edge 24 acting on the level surface is curved axially outwardly at a radius of curvature of 75 to 800 mm. The location of the farthest axial protrusion of the curved cutting edge 24 lies on a radius of 47 mm. Thus, this location of the farthest axial protrusion of the cutting edge 24 lies radially further inward than the area of a width of 2 mm worked by the short cutting edges at the front of the cutting plates 16. In other words, this situation can also be expressed in such a way that the finishing circle diameter of 94 mm is smaller than the diameter of the area processed at the front by the cutting plates 16.

The finishing inserts 18 are respectively seated in a suitable axial, or mainly axial, bore 26 in a tooth 14' which is wider than the adjacent teeth 14 of the milling cutter body 10. This bore has a smaller diameter in its rear area and there is embodied as a threaded bore, into which a stud-screw-shaped adjusting screw 28 with two oppositely-turning thread sections can be screwed with one of the thread sections. The other one of the two oppositely-turning thread sections of the adjusting screw 28 can be screwed into a suitable threaded bore in the rear end of the finishing insert. When the one threaded section of the adjusting screw 28 has been screwed into the milling cutter body 10 and the other threaded section into the finishing insert 18, it is possible to axially adjust the latter by turning the screw 28 without having to turn the finishing insert in the bore 26 in the process. In the case of the example, the screw 28 has an interior hexagonal opening in its rear end, so that it can be rotated by means of a screwdriver which fits into the interior hexagonal opening and can be introduced from behind into the through-bore 26. After a defined position of the finishing insert 18 has been set by means of the screw 28, it is possible to clamp it in place with the aid of a clamping screw 32, which can be screwed into a threaded bore 30 extending approximately tangentially, or obliquely in respect to the tangential direction, into the tooth 14' and the through-bore 26.

The milling tool in accordance with FIG. 1 has three finishing inserts 18, which are evenly distributed over its circumference. Depending on the embodiment and the circumferential spacing of the cutting plates 16 and teeth 14, there is the possibility, if desired, of soldering a cutting plate 16 also on the front flanks of those teeth 14' which are provided with a bore 26. If this is not possible for reasons of space, the teeth 14' in the exemplary embodiment which support the finishing inserts 18 can be given a different shape and the attachment of a cutting plate 16 to these teeth can be omitted.

What is claimed is:

1. A monobloc surface milling cutter having an axial axis of rotation and, having:
    cutting plates made of polycrystalline diamond (PCD), monocrystalline diamond (MCD) or polycrystalline boron nitrite (PCB), which are fastened to a milling cutter body in a non-detachable, material-to-material fashion, and
    axially adjustable finishing inserts mounted by screws in at least two substantially axially extending threaded bores, which are defined by and open at the front of the milling cutter body and which positively hold the finishing inserts against centrifugal forces; and
    wherein each finishing insert can be axially adjusted by means of a screw with two oppositely-turning threads which cooperate with a matched threaded bore in the milling cutter body and in the finishing insert, respectively, and a clamping screw threaded into said body to fix said insert in place in said axially extending bore.

2. The surface milling cutter in accordance with claim 1, characterized in that the finishing inserts are also equipped with cutting plates made of PCD, MCD or PCB, which are fastened to said finishing inserts by means of non-detachable, material-to-material contact.

3. The surface milling cutter in accordance with claim 1, characterized in that the cutting edges of the finishing inserts respectively, extend radially, or with a radial direction component, in relation to said axis of rotation of the milling cutter and are forward curved at a radius of 75 to 800 mm.

4. The surface milling cutter in accordance with claim 3, characterized in that the point of the cutting edge of each finishing insert, which is axially curved the farthest forward, is located in relation to the axis of rotation of the milling cutter on a finishing circle diameter which is maximally 4 to 8 mm less than the diameter created by the cutting edges of said cutting plates arranged on the exterior circumference of the milling cutter body.

* * * * *